(12) United States Patent
Shahar et al.

(10) Patent No.: US 7,146,072 B2
(45) Date of Patent: Dec. 5, 2006

(54) ALL OPTICAL PHASE INSENSITIVE CODE RESPONSIVE AND CODE SEPARATOR DEVICES APPARATUS AND METHOD

(75) Inventors: Arie Shahar, Rye Brook, NY (US); Eldan Halberthal, Rye Brook, NY (US)

(73) Assignee: Main Street Ventures, LLC, White Plains, NY (US)

( * ) Notice: Subject to any disclaimer, the term of this patent is extended or adjusted under 35 U.S.C. 154(b) by 228 days.

(21) Appl. No.: 10/871,008

(22) Filed: Jun. 21, 2004

(65) Prior Publication Data

US 2004/0234217 A1 Nov. 25, 2004

Related U.S. Application Data

(63) Continuation-in-part of application No. 10/827,314, filed on Apr. 20, 2004, and a continuation-in-part of application No. 10/826,363, filed on Apr. 19, 2004, and a continuation-in-part of application No. 10/813,108, filed on Mar. 31, 2004, now Pat. No. 6,990,281, and a continuation-in-part of application No. 10/404,077, filed on Apr. 2, 2003, now Pat. No. 6,892,016, and a continuation-in-part of application No. 10/404,140, filed on Apr. 2, 2003, now Pat. No. 6,795,626.

(60) Provisional application No. 60/480,746, filed on Jun. 24, 2003, provisional application No. 60/461,796, filed on Apr. 11, 2003, provisional application No. 60/464,351, filed on Apr. 22, 2003, provisional application No. 60/465,237, filed on Apr. 25, 2003, provisional application No. 60/405,697, filed on Aug. 22, 2002.

(51) Int. Cl.
*G02B 6/12* (2006.01)
*G02B 6/42* (2006.01)
*G02B 6/00* (2006.01)
*G02B 6/10* (2006.01)
*G06K 7/10* (2006.01)
*H04K 1/00* (2006.01)
*H03M 1/22* (2006.01)

(52) U.S. Cl. ............... 385/27; 385/14; 385/15; 385/16; 385/122; 385/130; 385/140; 235/454; 341/13; 341/14; 380/256

(58) Field of Classification Search ............ 385/14–16, 385/27, 122, 130, 140; 235/454, 462.1; 341/13, 341/14; 380/256; 375/341; 359/108
See application file for complete search history.

(56) References Cited

U.S. PATENT DOCUMENTS 6,580,857 B1 *   6/2003   King ........................ 385/39
2003/0035187 A1 * 2/2003   Richardson et al. ........ 359/189

* cited by examiner

*Primary Examiner*—Frank G. Font
*Assistant Examiner*—Jerry Martin Blevins
(74) *Attorney, Agent, or Firm*—Pearl Cohen Zedek Latzer LLP

(57) ABSTRACT

Exemplary embodiments of some aspects of the invention provide an optical decoding device including: a splitting device having first, second, and third, terminals; a nonlinear element; and an attenuator, wherein the second and third terminals are associated with an optical loop including the attenuator and the nonlinear element, the nonlinear element being displaced from a mid-point of the optical loop, and wherein the decoding device is able to receive multiple encoded signals via the first terminal, to decode at least one of the encoded signals and to provide a decoded signal at the first terminal in response to the at least one encoded signal. Exemplary embodiments of further aspects of the invention provide an optical code responsive device for decoding optical encoded signals, codes, and/or symbols, for header processing, for header reading, for address decoding and/or for optical packet routing.

28 Claims, 5 Drawing Sheets

ALL OPTICAL PHASE INSENSITIVE CODE RESPONSIVE AND CODE SEPARATOR DEVICES APPARATUS AND METHOD

CROSS-REFERENCE TO RELATED APPLICATIONS

The present invention claims the benefit of U.S. Provisional Patent Application Ser. No. 60/480,746 (now expired), filed Jun. 24, 2003, entitled "All Optical Phase Insensitive Code Responsive and Code Separator Devices Apparatus and Method".

In addition, this application is a Continuation-In-Part of U.S. patent application Ser. No. 10/404,140, filed Apr. 2, 2003 now U.S. Pat. No. 6,795,626, entitled "Optical Threshold Devices and Method", now U.S. Pat. No. 6,795,626, which claims benefit of U.S. Provisional Patent Application Ser. No. 60/405,697 (now expired), filed Aug. 22, 2002, entitled "Optical Switching Apparatus, System, and Method".

In addition, this application is a Continuation-In-Part of U.S. patent application Ser. No. 10/404,077, filed Apr. 2, 2003 now U.S. Pat. No. 6,892,016, entitled "Optical Threshold Devices and Method", now U.S. Pat. No. 6,892,016, which claims benefit of U.S. Provisional Patent Application Ser. No. 60/405,697 (now expired), filed Aug. 22, 2002, entitled "Streaming Signal Control System for Digital Communication".

In addition, this application is a Continuation-In-Part of U.S. patent application Ser. No. 10/813,108, filed Mar. 31, 2004 now U.S. Pat. No. 6,990,281, entitled "All Optical Logic Gates", now U.S. Pat. No. 6,990,281, which claims the benefit of U.S. Provisional Patent Application Ser. No. 60/461,796 (now expired), filed Apr. 11, 2003, entitled "All Optical Logic Gates".

In addition, this application is a Continuation-In-Part of U.S. patent application Ser. No. 10/826,363, filed Apr. 19, 2004, entitled "All Optical Chopping for Shaping and Reshaping Apparatus and Method", which claims the benefit of U.S. Provisional Patent Application Ser. No. 60/464,351 (now expired), filed Apr. 22, 2003, entitled "All Optical Chopping for Shaping and Reshaping Apparatus and Method".

In addition, this application is a Continuation-In-Part of U.S. patent application Ser. No. 10/827,314, filed Apr. 20, 2004, entitled "All Optical Chopping Using Logic Gates Apparatus and Method", which claims the benefit of U.S. Provisional Patent Application Ser. No. 60/465,237 (now expired), filed Apr. 25, 2003, entitled "All Optical Chopping Using Logic Gates Apparatus and Method".

All of the above-identified patent applications are incorporated herein by reference in their entirety.

FIELD OF INVENTION

The invention relates to optical communication devices and systems, in particular to all optical packet routing, self optical packet routing, header processing, header recognition, code reading, code separating, demultiplexing, shaping, chopping, reshaping, and dispersion correction.

BACKGROUND OF THE INVENTION

In the field of optical communication there is a strong demand for high transmission rate of information. The optical fibers used as the carrying medium are capable of transmitting the desired rates of information. However, the switching rate of the switches at the nodes and junctions of the communication networks are not fast enough to switch the desired information rates, carried by the optical fibers, resulting in bottlenecks produced by the switches. The switches used today in the optical communication networks are electronic switches that process the information electronically. The electronic switches require the use of Optical-Electrical-Optical (O-E-O) converters to convert the optical signals, received from the fibers, into electronic signals. The converted electronic signals are processed by the electronic switches for switching purposes. After the electronic switching the O-E-O converters convert the switched electronic signals, received from the electronic switches, back into their optical form to be sent into the optical fibers along the desired (switched) destination.

Unfortunately, the use of electronic switches in optical communication networks may have the following disadvantages:

1. Electronic switches require the use of O-E-O converters which are very expensive.
2. Prior to the switching action, the electronic switches store and buffer the information in a time consuming process.
3. Processing the information for the switching purpose is another time consuming action.
4. The switching process itself requires the activation of controllers, yet another time consuming process.
5. The electronic switches are generally large, power consuming, and difficult to maintain.

Accordingly, there is a strong need for alternative switching technology that does not suffers from the above disadvantages. The use of all optical switches may save the need for O-E-O converters, however, the optical switches used today are even slower than the electronic switches and lack the intelligence needed for routing the information.

In addition, in the field of optical communication there is a strong demand for optical shaping, reshaping, and chopping of optical signals to perform transmission of optical information at a very high quality and very low Bit Error Rate (BER).

The implementation of ultra fast optical communication network faces, among other challenges, three obstacles. The first is the need to produce very fast modulators. The second is to maintain high quality optical signals along significant distances to keep very low BER. The third is to switch the information at a very high rate.

To overcome the first obstacle of producing the signals, at a very fast rate, there is a need for very fast modulators that are capable of producing very narrow optical pulses. Fast modulators are generally expensive and there are only a few types of modulators capable of producing narrow optical pulses suitable for use in extremely fast rate.

At a high transmission rate, the pulse quality of the optical pulses degrades very fast in a relatively short distance due to pulse broadening caused by chromatic and polarization-mode dispersions. Accordingly, to overcome the second obstacle of maintaining high quality optical signals along significant distances, many Optical-Electrical-Optical (O-E-O) regenerators may be distributed along the optical propagation path. O-E-O regenerators are very expensive and complex and thus dramatically increase the network cost in terms of infrastructure initial cost and maintenance cost. In addition, the O-E-O regenerators may reduce network reliability.

The third obstacle, of switching at a very high speed, remains unsolved due to the lack of an efficient, optical, switching alternative capable of replacing the electronic switches used for information routing.

SUMMARY OF THE INVENTION

It is an object of some exemplary embodiments of the present invention to provide all optical devices that can respond to optical codes to be used for information routing and demultiplexing by providing an optical header processor for optical packet routing and self optical packet routing.

It is another object of some exemplary embodiments of the present invention to provide all optical code separators that can rapidly read the optical code that represents the information's destination in the header of an optical packet and to separate this code from the payload of the optical packet.

It is yet another object of some exemplary embodiments of the present invention to provide all optical code responsive and code separators devices capable of producing narrow pulses.

It is yet another object of some exemplary embodiments of the present invention to provide all optical code responsive and code separator devices that also operate as pulse shapers and pulse choppers, capable of shaping and reshaping affected pulses, thus improving their quality.

It is still another object of some exemplary embodiments of the present invention to provide all optical code responsive and code separator devices that may replace or provide at least part of the technology to replace electronic switches by all optical switches.

In one version, exemplary embodiments of the present invention provide an optical decoding device, including:
  a splitting device having first, second, and third terminals;
  a nonlinear element; and
  an attenuator,
    wherein said second and third terminals are associated with an optical loop including said attenuator and said nonlinear element, said nonlinear element being displaced from a mid-point of said optical loop, and
    wherein said decoding device is able to receive multiple encoded signals via said first terminal, to decode at least one encoded signal of said multiple encoded signals, and to provide a decoded signal at said first terminal in response to said at least one encoded signal.

In an alternative version, exemplary embodiments of the present invention provide an optical code responsive device for decoding optical encoded signals, codes and/or symbols, for header processing, for header reading, for address decoding and/or for optical packet routing, the device comprising:
  a splitting device having first, second, and third terminals;
  a nonlinear element; and
  an attenuator,
    wherein said second and third terminals are associated with an optical loop including said attenuator and said nonlinear element, said nonlinear element being displaced from a mid-point of said optical loop,
    wherein said splitting device is able to receive encoded signals via said first terminal, each of said encoded signals having first and second pulses, and to produce first and second images of each of said encoded signals, said first and second images counter-propagating along said optical loop, and
    wherein said code responsive device is able to produce a response signal at said first terminal in response to encoded signals for which one of said pulses of said first image is able to modulate the phase of one of said pulses of said second image via said nonlinear element.

In another alternative version, exemplary embodiments of the present invention provide an optical code responsive device for decoding optical codes, for header processing, for header reading, and/or for optical packet routing, comprising:
  a splitting device having first, second, and third terminals;
  a nonlinear element having a recovery time $\tau_r$; and
  an attenuator,
    wherein said second and third terminals are associated with an optical loop including said attenuator and said nonlinear element, said nonlinear element being displaced by a distance $\Delta S$ from a mid-point of said optical loop,
    wherein said splitting device is able to receive, via said first terminal, code signals including first and second pulses separated by a distance $\Delta S_1$ and having a width $W_1$, and
    wherein said code responsive device is able to produce a response signal at said first terminal in response to one or more of said code signals that satisfy the mathematical expression $|2 \cdot \Delta S - \Delta S_1| < W_1 + \tau_r \cdot C/n$, where C is the speed of light in vacuum and n is the refractive index of the signal guide in said loop.

In yet another alternative version, exemplary embodiments of the present invention provide an optical device for decoding signals, comprising:
  a splitting device having first, second, and third, terminals;
  a nonlinear element; and
  an attenuator,
    wherein said second and third terminals are associated with an optical loop including said attenuator and said nonlinear element, said nonlinear element being displaced from a mid-point of said optical loop, and
    wherein said device is able to receive a plurality of signals, at least one of which signals being an encoded signal.

BRIEF DESCRIPTION OF THE DRAWINGS

FIG. 1a is a schematic illustration of a threshold device according to exemplary embodiments of the present invention, including a non-linear optical loop, i.e., and optical loop structure including Non Linear Elements;

FIG. 1b is a schematic illustration of an exemplary attenuator design that may be used in conjunction with the threshold device of FIG. 1a;

DETAILED DESCRIPTION OF EXEMPLARY EMBODIMENTS OF THE INVENTION

1. All Optical Threshold Device

Figures 1A, 1B:
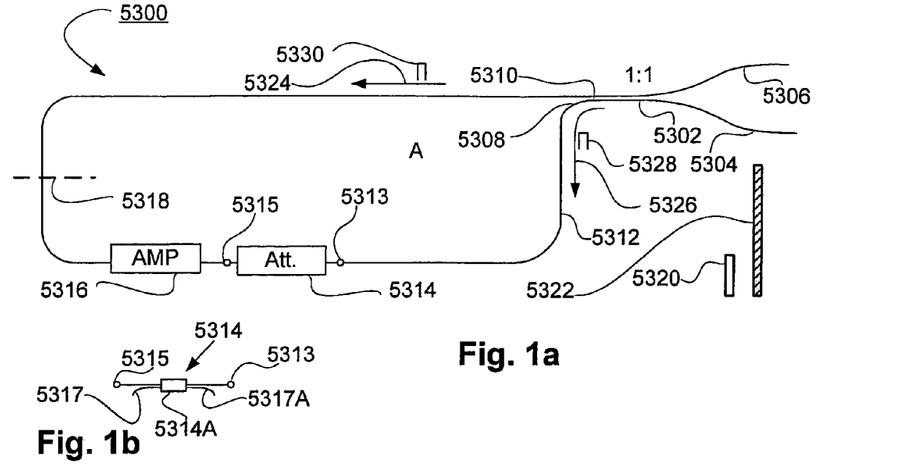

Reference is made to FIG. 1a, which schematically illustrates an optical threshold device, denoted 5300, in accordance with exemplary embodiments of another aspect of the present invention. Reference is also made to FIG. 1b, which schematically illustrates an attenuator 5314 that may be used in conjunction with exemplary embodiments of the device of FIG. 1a. The design of device 5300 may be beneficial because it is generally insensitive to the phase of the light signals and thus does not require a phase shifter or phase control. Device 5300 includes a symmetric directional coupler 5302 having an input terminal 5304 and an output terminal 5306. Additional two terminals 5308 and 5310 of coupler 5302 may be connected to each other via a loop 5312 in a configuration similar to a loop mirror, as described below. Loop 5312 may include an amplifier 5316 and attenuator 5314. Amplifier 5316 may include any suitable type of amplifier, for example, a Semiconductor Optical Amplifier (SOA) (also commonly known as Solid-state Optical Amplifier), Linear Optical Amplifier (LOA), or Erbium Doped Fiber Amplifier (EDFA). Attenuator 5314, which may be connected between connection points 5313 and 5315 on loop 5312, may include any suitable type of attenuator, for example, a Variable Optical Attenuator (VOA). It should be appreciated that the attenuators and/or VOA's used in conjunction with embodiments of the present invention may be implemented in the form of any type of device that causes attenuation of signals, including devices not conventionally used for attenuation purposes. For example, in some embodiments, an attenuation function may be implemented by a perturbation in the optical path along the loop, such as, any portion that introduces loss or a portion of a radiation guide having sharp transmissions to the radiation guides with whose it is associated. In an alternative example, an optical amplifier, e.g., a SOA, a LOA, or an EDFA, excited to levels at which the amplifier absorbs rather than amplifies input signals. In some exemplary embodiments, attenuator 5314 may include a fixed or variable coupler 5314A, connected between connection points 5313 and 5315, as illustrated schematically in FIG. 1b. The attenuation factor of attenuator 5314 may be adjustable and may depend on the fraction of energy that coupler 5314A may transmit between points 5313 and 5315 as well as the fraction of energy that coupler 5314 may couple out via a set of terminals, denoted 5317 and 5317A. When an input pulse, such as pulse 5320, is received at input 5304 of device 5300, the input pulse may be split by symmetric coupler 5302, e.g., at a splitting ratio of 1:1, into ports 5308 and 5310, respectively. A split pulse 5330 transmitted by port 5310 may propagate counterclockwise (i.e., in the direction of arrow 5324) and its phase may be shifted, by coupler 5302, π/2 radians (i.e., crossbar transmission or crossover transmission). The split pulse 5328 transmitted by port 5308 may propagate clockwise (i.e., in the direction of arrow 5326) and its phase may not be shifted by coupler 5302 (i.e., bar transmission).

It should be noted that if loop 5312 does not include a NLE component, such as amplifier 5316, the pulses 5330 and 5328 that propagate counterclockwise and clockwise, respectively, complete their travel around loop 5312 and return to ports 5308 and 5310, respectively, with equal amplitudes and the same relative phases. The relative phase is maintained because both pulses 5328 and 5330, which propagate in mutually opposite directions, travel exactly the same distance, i.e., the length of loop 5312. The amplitudes of pulses 5328 and 5330 returning to ports 5310 and 5308, respectively, are equal to each other because they travel through the exact same medium, which is symmetric and linear for both propagation directions. This means that pulse 5330 that returns to port 5308 is π/2 radian ahead with respect to pulse 5328 that returns to port 5310. On their return paths, each of pulses 5328 and 5330, upon arrival at ports 5310 and 5308, respectively, may be re-split into ports 5306 and 5304, e.g., at a 1:1 ratio for each split, wherein the crossover split produces a phase shift of π/2 radians and the bar split does not produce any phase shift. Accordingly, the crossbar split of pulse 5330 from port 5308 may destructively interfere with the bar split of pulse 5328 from port 5310, thereby to produce substantially zero output at output port 5306. At the same time, the crossbar split of pulse 5328 from port 5310 may constructively interfere with the bar split of pulse 5330 from port 5308, thereby to produce a reflected signal that carries substantially the entire energy of pulse 5320 reflected back to input port 5304. Normalizing the input energy of pulse 5320 to a value of 1, the energy at output port 5306, when loop 5312 does not includes NLE 5316, maybe given by:

$$I_{5306} = A \cdot \left[ \frac{1}{\sqrt{2}} \cdot \frac{1}{\sqrt{2}} + \frac{j}{\sqrt{2}} \cdot \frac{j}{\sqrt{2}} \right]^2 = 0 \tag{1}$$

where j indicates a phase shift of π/2 radians, and A is the intensity attenuation factor of attenuator 5314.

The energy reflected back to input port 5304 may be given by:

$$I_{5304} = A \cdot \left[ \frac{1}{\sqrt{2}} \cdot \frac{j}{\sqrt{2}} + \frac{j}{\sqrt{2}} \cdot \frac{1}{\sqrt{2}} \right]^2 = A \tag{2}$$

Figure 2:
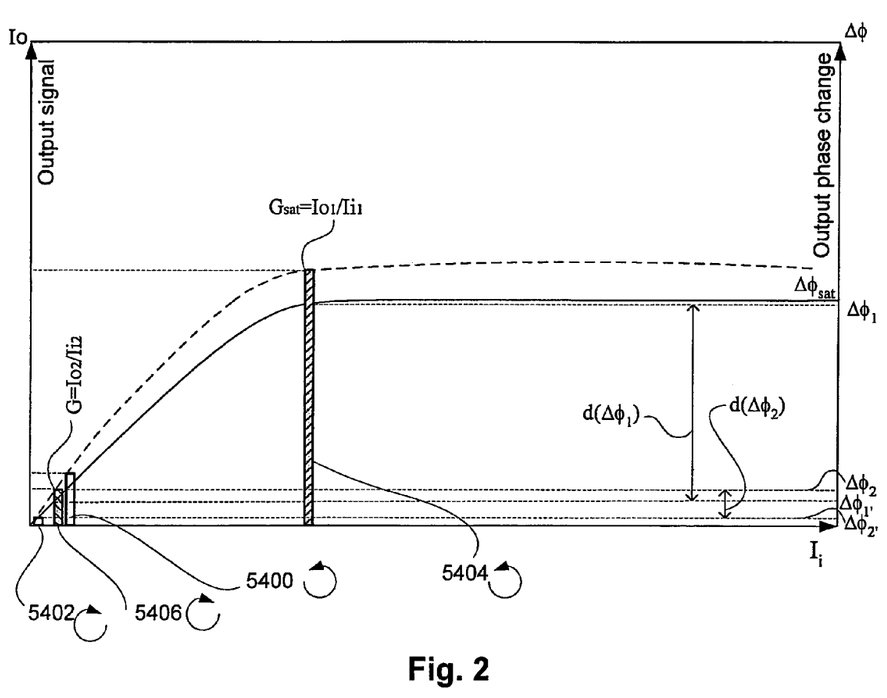
FIG. 2 is a schematic illustration of a graph depicting relative phase shift and intensity of output signals produced by a Non Linear Element (NLE) according to exemplary embodiments of the invention in response to input signals of two different amplitudes, showing two pulses propagating in opposite directions for each amplitude.

FIG. 2 schematically illustrates a graph showing the relative phase shift and intensity of the output signals of a NLE, for example, amplifier 5316 of FIG. 1a, versus the input signals for two different amplitudes of pulses that propagate in opposite directions. FIG. 2 is useful in analyzing the operation of device 5300 in FIG. 1a where loop 5312 includes amplifier 5316. The graph of FIG. 2 shows the transmission function of the output intensity Io and the output phase shift Δφ of NLE amplifier 5316 versus the input intensity Ii. When lower level input pulse 5320 having a normalized field amplitude value of 1 is received by input 5304 of device 5300 in FIG. 1a, the field amplitude of split pulse 5330, denoted 5400 in FIG. 2, propagating in the counterclockwise direction indicated by arrow 5324 in FIG. 1a, is $1/\sqrt{2}$ at the entrance of amplifier 5316. Further, in this scenario, the field amplitude of split pulse 5328, denoted 5402 in FIG. 2, propagating in the clockwise direction indicated by arrow 5326 in FIG. 1a, is $\sqrt{A}/\sqrt{2}$ at the entrance to amplifier 5316. Factor A represents the level of power intensity attenuation resulting from attenuator 5314. Since both pulses, i.e., pulses 5400 and 5402, may be within the linear range of amplifier 5316, the two pulses may be amplified by amplifier 5316 by the same intensity gain factor $G_{linear}$. The two pulses are also attenuated by the same factor A at attenuator 5314. Accordingly, both pulses return to ports 5308 and 5310 after undergoing substantially the same attenuation, A, and the same amplification, $G_{linear}$. Thus, the amplitudes of the two pulses, after amplification and attenuation, may be substantially equal to each other.

As described above, pulses 5400 and 5402 enter amplifier 5316 of FIG. 1a with different field amplitudes, e.g., $1/\sqrt{2}$ and $\sqrt{A}/\sqrt{2}$, respectively. Accordingly, amplifier 5316 may shift the phases of pulses 5400 and 5402 by different amounts. However, since pulses 5400 and 5402 are low amplitude pulses, their phases may be shifted only by small shifts, $\Delta\phi_2$ and $\Delta\phi_{2'}$, respectively, yielding an even smaller additional relative phase shift, $d(\Delta\phi_2)=\Delta\phi_2-\Delta\phi_{2'}$, between the pulses. The influence of such additional relative phase shift is generally insignificant for the purposes of the invention. Accordingly, the additional relative phase shift produced by amplifier 5316 between pulses 5400 and 5402 is negligible and pulses 5400 and 5402 may return to ports 5308 and 5310 with amplitudes that are substantially equal to each other and with a relative phase shift substantially equal to their original relative phase shift, i.e., similar to the relative phase shift originally produced by coupler 5302, e.g., a phase shift of about $\pi/2$ radians.

Because the amplitudes of the pulses returning to ports 5308 and 5310 are substantially equal to each other, and due to the small influence of amplifier 5316 on the relative phases of pulses 5400 and 5402 for low level input signals, the behavior of device 5300 in this case may be generally similar to that of an analogous device (not shown) without amplifier 5316 in loop 5312. Accordingly, in the case of low level input signals, substantially all the energy of pulse 5320, after amplification by gain $G_{linear}$ and attenuation A, may be reflected back to input 5304. Based on the above, the intensity $I_{5306}$ at output port 5306 and the intensity $I_{5304}$ reflected back to port 5304 may be given by the following equations:

$$I_{5306} = G_{linear} \cdot A \cdot \left[\frac{1}{\sqrt{2}} \cdot \frac{1}{\sqrt{2}} + \frac{j}{\sqrt{2}} \cdot \frac{j}{\sqrt{2}}\right]^2 = 0 \quad (3)$$

$$I_{5304} = G_{linear} \cdot A \cdot \left[\frac{1}{\sqrt{2}} \cdot \frac{j}{\sqrt{2}} + \frac{j}{\sqrt{2}} \cdot \frac{1}{\sqrt{2}}\right]^2 = G_{linear} \cdot A \quad (4)$$

where $G_{linear}$ represents the intensity amplification gain within the linear range.

The desired situation in which substantially all the energy of the low level input pulse may be reflected back into the input and there is substantially no signal at the output may be achieved by using symmetric couplers, such as coupler 5302. It should be appreciated that the above described feature of the present invention, whereby substantially all the energy of the low level input pulse is reflected back to the input, leaving substantially no signal at the output, cannot be achieved in devices based on using asymmetric coupler at the entrance to the loop mirror.

For higher-level input pulses, for example, pulse 5322 in FIG. 1a, having field amplitude H, the counterclockwise split pulse 5404 may enter amplifier 5316 with a field amplitude $H/\sqrt{2}$, which may fall within the linear or saturation range of amplifier 5316. The clockwise split pulse 5406 may enter amplifier 5316 with a field amplitude $\sqrt{A}\cdot H/\sqrt{2}$, which falls within the linear range of amplifier 5316. Counterclockwise split pulse 5404 may be amplified by amplifier 5316 by intensity gain factor $G_{sat}$, which is smaller than $G_{linear}$ due to the reduced gain in the saturation region, and the phase of pulse 5404 is shifted by the same amplifier 5316 by $\Delta\phi_1=\Delta\phi_{sat}$. Clockwise split pulse 5406 is amplified by amplifier 5316 by gain factor $G_{linear}$, in the linear region, and the phase of pulse 5406 is shifted by the same amplifier 5316 by $\Delta\phi_{1'}$. Although the ratio between low amplitude pulses 5400 and 5402 may be similar to the ratio between higher amplitude pulses 5404 and 5406, namely, a ratio equal to one divided by the field amplitude attenuation factor $\sqrt{A}$, the difference between the amplitudes of pulses 5404 and 5406 may be much larger than the difference between the amplitudes of pulses 5400 and 5402. Accordingly, the relative phase shift between high level pulses 5404 and 5406, denoted $d(\Delta\phi_1)=(\Delta\phi_{sat}-\Delta\phi_{1'})$, may be much larger than the relative phase shift between low level pulses 5400 and 5402, denoted $d(\Delta\phi_2)$. This means that pulses 5404 and 5406 return to ports 5308 and 5310 with different field amplitudes $\sqrt{G_{sat}}\cdot\sqrt{A}\cdot H/\sqrt{2}$, $\sqrt{G_{linear}}\cdot\sqrt{A}\cdot H/\sqrt{2}$, respectively, and significant different phase shifts, $\Delta\phi_{sat}$ and $\Delta\phi_1$, respectively.

Thus, for such high level inputs, when choosing the proper length of amplifier 5316, $d(\Delta\phi_1)$ may be adjusted to be equal to $\pi$radians while still maintaining a negligible value, $d(\Delta\phi_2)$, of the relative phase shift for low-level input amplitudes. When $d(\Delta\phi_1)$ is equal to $\pi$radians, a relatively large fraction of the energy of the higher-level input pulse 5322 may be emitted out by device 5300 through its output 5306 and only a small fraction may be reflected back through input 5304. In this case, the output intensity $I_{5306}$ and the intensity $I_{5304}$ reflected back into input 5304 may be given by:

$$I_{5306} = H^2 \cdot A \cdot \left[\frac{\sqrt{G_{linear}}}{\sqrt{2}} \cdot \frac{1}{\sqrt{2}} + \frac{\sqrt{G_{sat}}}{\sqrt{2}} \cdot \frac{1}{\sqrt{2}}\right]^2 \neq 0 \quad (5)$$

$$I_{5304} = H^2 \cdot A \cdot \left[\frac{\sqrt{G_{linear}}}{\sqrt{2}} \cdot \frac{j}{\sqrt{2}} - \frac{j}{\sqrt{2}} \cdot \frac{\sqrt{G_{sat}}}{\sqrt{2}}\right]^2 \quad (6)$$

In the above discussion, device 5300 is analyzed for the case where the reduced amplitude pulse 5406 is in the linear region of amplifier 5316 and the unreduced amplitude pulse 5404 is in the saturated region of that amplifier. It should be noted that there are at least two additional settings relevant to describing effective operation of device 5300. In a first additional setting, pulses 5406 and 5404 have the same gain $G_{linear}$; however, the phase sifts produced for the two pulses by amplifier 5316 are different. In a second additional setting, amplifier 5316 shifts the phases of pulses 5406 and 5404 by the same amount $\Delta\phi_1=\Delta\phi_{sat}$; however, the gains produced for the two pulses by amplifier 5316 are different.

It should be appreciated that the analysis of device 5300 for the two additional settings of device 5300, in the case of low level input signals, may be generally the same as discussed above with reference to the case where no output signal is produced. Therefore, the two additional settings of device 5300 are not further analyzed herein in the context of low-level input signals.

Analyzing device 5300 in the range of high input signals, according to the first additional setting, it is noted that pulses 5406 and 5404 are both in the linear region of amplifier 5316. In this case, when amplifier 5316 is sufficiently long, when the length of the amplifier is appropriately adjusted and when attenuation factor A is adjusted to produce the proper ratio between pulses 5404 and 5406, the relative phase shift $d(\Delta\phi_1)$ may be adjusted to be equal to $\pi$ radians even when the amplitude of pulse 5404 is still in the linear range. Accordingly, pulses 5404 and 5406 are amplified by the same factor $G_{linear}$. Therefore, $G_{sat}$ may be replaced by $G_{linear}$ in the above equations 9, taking into account phase inversion. In this first additional setting, for high-level input signals, the entire energy may be emitted from output port 5306 and substantially no energy may be reflected back through input 5304.

According to the second additional setting, analyzed for the case of high level input signals, the amplitude of pulse 5406 may be sufficiently high to be included in the saturated range of amplifier 5316 and, thus, amplifier 5316 may not produce any relative phase shift $d(\Delta\phi_1)$ between pulse 5406 and pulse 5404, because both pulses are in the saturated region of amplifier 5316. However, since pulse 5404 may be at a much deeper saturation level than pulse 5406, pulse 5404 may have a gain, $G_{sat1}$, that is much lower than the gain, $G_{sat2}$, of pulse 5406. In this case, the transmitted intensity $I_{5306}$ and the reflected intensity $I_{5304}$ may be given by:

$$I_{5306} = H^2 \cdot A \cdot \left[ \frac{\sqrt{G_{lsat2}}}{\sqrt{2}} \cdot \frac{1}{\sqrt{2}} - \frac{\sqrt{G_{sat1}}}{\sqrt{2}} \cdot \frac{1}{\sqrt{2}} \right]^2 \neq 0 \quad (7)$$

$$I_{5304} = H^2 \cdot A \cdot \left[ \frac{\sqrt{G_{lisat2}}}{\sqrt{2}} \cdot \frac{j}{\sqrt{2}} + \frac{j}{\sqrt{2}} \cdot \frac{\sqrt{G_{sat1}}}{\sqrt{2}} \right]^2 \quad (8)$$

Accordingly, device 5300 may operate as a threshold device that produces substantially no output signal for lower level input signals, while emitting a large fraction of the energy of higher level input signals through its output 5306. It is clear that, for all the versions of device 5300 described above, the larger the ratio between pulses 5404 and 5406, the larger the relative phase shift $d(\Delta\phi_1)$ between the pulses and the larger the different between $G_{linear}$ and $G_{sat}$, resulting in improved operation of device 5306 for the higher level input signals. It should be appreciated that, in device 5300 according to exemplary embodiments of the present invention, there may be virtually no limitation on the ratio between pulses 5404 and 5406, and the ratio may be as desired, for example, equal to one over the attenuation factor of attenuator 5314. Further, in view of the above analysis, it should be appreciated that although the use of a large attenuation factor, i.e., a small value for A, may improve the performance of device 5300 in the range of higher level input signals, such large attenuation does not degrade the performance of device 5300 in the range of lower level input signals.

Referring again to FIG. 1a, a virtual mid point 5318 divides loop 5312 into two halves, wherein each half has an equal length, S, representing the distance from port 5310 to mid point 5318 or from port 5308 to mid point 5318. It is noted that the counterclockwise pulse 5330 and the clockwise pulse 5328 inherently meet and overlap each other at mid point 5318. When streams of pulses that are separated from each other by time periods, T, enter loop 5312 of device 5300, and split into clockwise and counterclockwise streams, a pulse in the counterclockwise stream, such as pulse 5330, meets a pulse in the clockwise stream, such as pulse 5328, every half time period, T/2. This means that after every distance given by:

$$X = T/2 \cdot C/n \quad (9)$$

wherein C is the speed of light in vacuum and n is the refractive index of the optical guides, there is a meeting ("collision") point between pulses that propagate in loop 5312 in opposite directions. To avoid such collisions from occurring at the NLE, e.g., at amplifier 5316, the location of the NLE should be off center by a distance δS that may be given by:

$$l \cdot X < \delta S < m \cdot X \quad (10)$$

where X is the above given distance between two adjacent meeting (collision) points and l and m are consecutive integers. For the specific example of l=0 and m=1, Equation (10) may be reduced to: δS<X.

When a low amplitude pulse, such as pulse 5406, enters amplifier 5316 first, the pulse does not deplete an inverse population of the amplifier and, thus, a higher amplitude pulse 5404 may enter the NLE immediately following the exit of pulse 5406. In a situation when the order of the locations of amplifier 5316 and attenuator 5314 is reversed, the higher amplitude pulse may enter NLE 5316 first. In this reverse order case, the higher amplitude pulse may deplete the inverse population of amplifier 5316 and, thus, a recovery time Δτ may be needed for amplifier 5316 to build an inverse population before entry of a lower amplitude pulse. Therefore, in the latter case, or in a situation where the stream of input pulses includes only high amplitude pulses, T/2 may be longer than Δτ.

As discussed above, the efficiency of device 5300 may be improved by increasing the ratio between the higher and the lower levels included in the input signal. Further, the output signals produced by device 5300 that correspond to different levels of input pulses have a more distinctive amplitude ratio than the ratio between their respective input pulses. Accordingly, an improved threshold system in accordance with exemplary embodiments of the present invention may include a configuration of a more than one device 5300, for example, at least two devices 5300 connected in series, wherein the output signals from one device 5300 may be fed directly into the input of a subsequent device 5300. Such a configuration may be used to improve threshold capability by further accentuating the distinction between lower and higher amplitude pulses.

2. All Optical Code Responsive Gates

Figure 3:
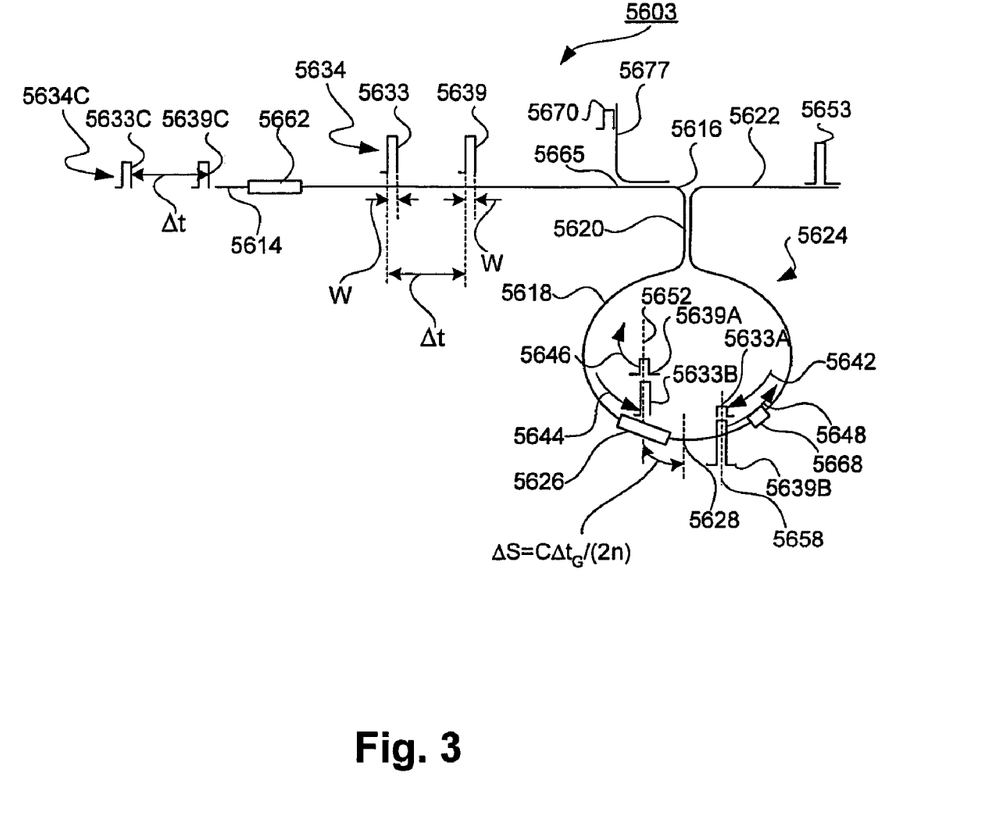
FIG. 3 is an illustration of a phase insensitive code responsive coincidence gate according to the present invention.

FIG. 3 illustrates a configuration for a code responsive coincidence gate 5603. Code responsive device 5603 may be used to detect specific codes, such as, the codes of optical headers used to label optical packets and to determine the destinations of the payloads in those packets. The codes may be signals in a form of encoded symbols that serve as the addresses of the packets and device 5603 may be a decoding device used to decode those symbols or addresses. Code responsive coincidence gate 5603 includes input 5614, connected, via coupler 5665, to input 5616 of a loop mirror (Sagnac loop) 5624. Loop mirror 5624 includes symmetric directional coupler 5620 having, on one of its sides, Input/Output (I/O) terminal 5616 and output 5622 and its other two terminals, on its other side, are connected to each other via loop 5618. Loop 5618 contains NLE 5626 and attenuator 5668. NLE 5626 may be an SOA, EDFA, or LOA that is displaced from mid point 5628 by a distance ΔS along loop 5618 to be located on line 5652. Mid point 5628 is the point on loop 5624 in which the distances to coupler 5620 in the clockwise and in the counterclockwise directions are the same.

Gate 5603 is characterized by the distance ΔS in which NLE 5626 is displaced along loop 5618 to the left of midpoint 5628. Alternatively, gate 5603 may be characterized by time $\Delta t_G$ indicating twice the time that it takes to split pulses 5633A, 5633B, 5639A, and 5639B, propagating in loop 5618, to travel a distance ΔS. Characterization time Δt_G of gate 5603 is given by:

$$\Delta t_G = \frac{2 \cdot \Delta S \cdot n}{C} \quad (11)$$

where n is the refractive index of the medium from which loop 5618 is made of and C is the speed of light in vacuum.

Gate 5603 may include optical amplifier 5662 at its input 5614 to assure that code 5634C, received at input 5614, including pulses 5633C and 5639C, will be amplified, by amplifier 5662, to produce code 5634 after amplifier 5662, that its pulses amplitudes 5633 and 5639 are above the threshold level of device 5624.

Device 5624 including I/O terminal 5616, output 5622, coupler 5620, loop 5618, amplifier 5626 and attenuator 5668, is similar to threshold device 5300 of FIG. 1a and behaves similarly. Same as explained above for device 5300 of FIG. 1a, in optimal conditions and when the amplitude of either input signals 5633 or 5639 is above the threshold of device 5624, they are emitted out of device 5624 through its non-coincidence output (transmitting output) 5622 and no signal returns back into I/O terminal 5616 or coincidence output (reflecting output) 5677.

Coupler 5665 may be replaced by another directing device, such as a circulator, to more efficiently direct the radiation from port 5614 to loop 5624 and from loop 5624 to coincidence port 5677. It should be noted that device 5603 may be constructed in or from media of fiber optics, discrete components, integrated optics, on-chip components, free space, vacuum and gaseous and accordingly directional coupler 5665 may be a coupler, circulator, Y-junction coupler, splitter, and beam splitter.

Coincidence gate 5603 may receive at its input port 5614 a code symbol 5634C including pulses 5633C and 5639C separated by time space Δt that coincides with the characterization time Δt_G of gate 5603. The term code symbol refers to a pulse pair that causes a gate response within a destined gate. Accordingly, code symbol 5634 including pair of large amplitude pulses 5639 and 5633 spaced apart by time space Δt is produced after amplifier 5662. Code symbol 5634 propagates through I/O terminal 5616 of device 5624 to be split, by coupler 5620, into two pairs of split pulses that propagate in loop 5618 in opposite directions. One pair includes split pulses 5639A and 5633A separated by time space Δt (which is equal to characterization time Δt_G). This pair of split pulses 5639A and 5633A travels clockwise along arrows 5646 and 5642, respectively, and is converted, by attenuator 5668, into a pair of small amplitude split pulses 5639A and 5633A that are in the linear range of amplifier 5626. The other pair includes high amplitude split pulses 5639B and 5633B that are also separated by time space Δt (or Δt_G). Large amplitude split pulses 5639B and 5633B may be in the linear region or in the saturated region of amplifier 5626 and travels counterclockwise along arrows 5648 and 5644, respectively. Since pulses 5639 and 5633 of code 5634 are separated by time space Δt that is equal to the characterization time Δt_G of gate 5603, their split pulses 5639A and 5633B pass, on their way back to coupler 5620, through amplifier 5626 while colliding or interacting with each other at or by this amplifier. In contrary, split pulses 5639B and 5633A pass, on their way back to coupler 5620, through amplifier 5626 without colliding or interacting with other signals at or by this amplifier.

The large amplitude of split pulses 5633B and 5639B may fall within the linear or saturated region of amplifier 5626; the amplitude of split pulses 5633A and 5639A is relatively small and is in the linear region of amplifier 5626. In the optimal case, the phase difference between the phase shifts, produced by amplifier 5626, for the high amplitude of split pulses 5633B and 5639B and the low amplitude of split pulses 5633A and 5639A is πradians. The phase of high amplitude split pulse 5639B passing through amplifier 5626 may be shifted according to the linear or saturated state of amplifier 5626. In spite of the fact that split pulse 5639A has low amplitude, the phase shift caused to this split pulse, by amplifier 5626, may be according to the linear or saturated state of amplifier 5626 when high amplitude split pulse 5633B pass through this amplifier. This phase shift is produced by amplifier 5626 since at the same time that pulse 5639A passes through amplifier 5626, this amplifier may be driven into saturated state, by high amplitude pulse 5633B. Thus, the phase of split pulse 5639B passing through amplifier 5626 is shifted by the same amount as the phase of split pulse 5633B when it passes through amplifier 5626 and collide or interact, at or by this amplifier, with pulse 5639A since amplifier 5626 may be saturated in both of the cases. When split pulses 5639A and 5633B overlap each other at amplifier 5626 they both experience the same phase shift, by amplifier 5626, even when amplifier 5626 is not saturated and operates in its linear region since both pulses 5639A and 5633B propagate simultaneously through the same optical medium of amplifier 5626. The phase change that large amplitude split pulse (optical component) 5633B introduces to small amplitude split pulse 5639A, via NLE 5626, is known as phase modulation. In the specific case where the modulating and the modulated pulses 5633B and 5639A, respectively, counter-propagate, the phase modulation is also known as cross-phase modulation.

Accordingly, pulses 5639A and 5639B return back to coupler 5620 and are combined there with the same relative phase in which they entered loop 5618 from coupler 5620. Thus the energy of combined pulses 5639A and 5639B is totally reflected back into I/O terminal 5616 and from there is transmitted, by coupler 5665 into coincidence port 5677 to appear there as coincidence signal 5670. In this case no output signal is generated at non-coincidence output 5622.

It can be seen that when NLE 5626 is displaced to the left of midpoint 5628 of loop 5618, coincidence signal 5670 formed at coincidence port 5677 is the result of the energy of pulse 5639 reflected back from loop 5618 into I/O terminal 5616 and from there to coincidence port 5677. Thus, coincidence pulse 5670 at coincidence port 5677 is the result of the first pulse 5639 between pair of pulses 5639 and 5633 of code symbol 5634.

High amplitude split pulse 5633B that passes through amplifier 5626 may drive this amplifier into saturated state even without the collision, on this amplifier, with pulse 5639A. This means that the collision of pulse 5633B with pulse 5639A may not influence the phase shift of pulse 5633B produced by amplifier 5626. Pulse 5633A passes through amplifier 5626 without any interaction with other pulses. Thus, pulses 5633A and 5633B return back to coupler 5620 and are combined there with a relative phase that is not influenced by the collision on amplifier 5626. In such a case, device 5624 operates, for pulses 5633A and 5633B, in the regular mode of a threshold device and as explained for threshold device 5300 of FIG. 1a. Accordingly, the energy of combined pulses 5633A and 5633B is thoroughly emitted from non-coincidence output 5622 as signal 5653 and no signal is reflected back into I/O terminal 5616 and thus no signal is generated at coincidence output 5677. Thus, non-coincidence pulse 5653 at non-coincidence port 5622 is the result of pulse 5633 which is the second pulse between pair of pulses 5639 and 5633, of code symbol 5634.

Gate 5603 may be constructed with displacement ΔS of NLE 5626 along loop 5618 which is displaced to the right of midpoint 5628 to locate NLE 5628 on line 5658. In this situation and similar to the explained above, small split amplitude pulse 5633A collides with large split amplitude pulse 5639B at newly located NLE 5626 and the phase of small pulse 5633A is shifted, by NLE 5626, by πradians relative to the phase of small amplitude pulse 5639A. When large split amplitude pulses 5633B and 5639B pass through NLE 5626, their phases are shifted by an a mount greater by πradians relative to the phase shift, produced by NLE 5626, when small amplitude pulse 5639A passes (alone) through NLE 5626. Accordingly, split pulses 5633A and 5633B are combined by coupler 5620 with the same relative phase that they had when they entered loop 5618, to constructively interfere at coupler 5620, thus reflecting back to I/O terminal 5616 and appearing at coincidence port 5677 to produce coincidence pulse 5670. In this case no signal is produced at non-coincidence terminal 5622. Split pulses 5639A and 5639B are combined by coupler 5620 with a relative phase that is different by πradians with respect to the relative phase that they had when they entered to loop 5618, to constructively interfere at coupler 5620, thus transmitting to non-coincidence port 5622 to produce coincidence pulse 5653. In this case no signal is produced at coincidence terminal 5677.

It can be seen that when NLE 5626 is displaced to the left of midpoint 5628 of loop 5618, coincidence gate 5603 responds to code symbol 5634 at input 5614 as follows:

1. The coincidence signal 5670 formed at coincidence port 5677 is the result of the energy of first pulse 5639 of code 5634 reflected back from loop 5618 into I/O terminal 5616 and from there to coincidence port 5677. Thus the timing of coincidence signal 5670 at port 5677 is in accordance with the timing of first pulse 5639 of code 5634 at input 5614.
2. The non-coincidence signal 5653 formed at non-coincidence port 5622 is the result of the energy of second pulse 5633 of code 5634 transmitted by loop mirror 5624 into terminal 5622. Thus the timing of non-coincidence signal 5653 at port 5622 is in accordance with the timing of second pulse 5633 of code 5634 at input 5614.

When NLE 5626 is displaced to the right of midpoint 5628 of loop 5618, coincidence gate 5603 responds to code symbol 5634 at input 5614 as follows:

1. Coincidence signal 5670 formed at coincidence port 5677 is the result of the energy of second pulse 5633 of code 5634 reflected back from loop 5618 into I/O terminal 5616 and from there to coincidence port 5677. Thus the timing of coincidence signal 5670 at port 5677 is in accordance with the timing of second pulse 5633 of code 5634 at input 5614.
2. The non-coincidence signal 5653 formed at non-coincidence port 5622 is the result of the energy of first pulse 5639 of code 5634 transmitted by loop mirror 5624 into terminal 5622. Thus the timing of non-coincidence signal 5653 at port 5622 is in accordance with the timing of first pulse 5639 of code 5634 at input 5614.

When Gate 5603 receives code 5634 having pulses 5633 and 5639 having time width W and amplitudes above the threshold level of gate 5603, but with time separation Δt between pulses 5633 and 5639 that does not coincide with the characterization time $\Delta t_G$ of gate 5603 and where $|\Delta t_G - \Delta t| \geq W$, there is no collision at NLE 5626 between any of the split pulses 5633A, 5633B, 5639A, and 5639B. Thus each pulse of pulses 5633 and 5639 of code 5634 propagates individually in gate 5603 and exits from non-coincidence output 5622 to produce a non-coincidence signal at port 5622 including two pulses. In this case no signal is produced at coincidence output port 5677.

When either one of the signals 5639 or 5633 passes through coupler 5665 and enters from guide 5614 to I/O terminal 5616 of loop mirror 5624, it is transmitted, by loop mirror 5624, into terminal 5622 as explained above for individual pulse 5322 transmitted by threshold device 5300 of FIG. 1a.

It should be clear that even under non-optimal conditions code responsive gate 5603 may produce response signal 5670 at coincidence port 5677 when time separation Δt between pulses 5639C and 5633C of code 5634C coincides or is correlated with the characterization time $\Delta t_G$ of gate 5603. Non-optimal conditions may be a relative phase shift between large and small optical-components in loop 5624 that is different than π radians. This non-optimal πphase shift may be caused due to different gains $G_{linear}$, $G_{sat}$ for small and large optical components in loop 5624, respectively. Under such non-optimal conditions, gate 5603 may still produce a response (coincidence or correlated) signal at coincidence port 5677 which may not include the whole energy of either pulse 5639C or 5633C of code 5634C and part of the energy of either pulse 5639C or 5633C may be emitted from non-coincidence port 5622. However, in such a case, gate 5603 still produces a type of response signal 5670 at coincidence port 5677 that is unique only for a specific code that gate 5603 is designed for by selecting:

$$|\Delta t_G - \Delta t| \leq W \qquad (12)$$

The above Equation (12) is a mathematical condition for creating response signal (coincidence signal) 5670 at port 5677 of device 5603 and is expressed in terms of time. However, it may be expressed in terms of distances corresponding to the times of Equation (12) as well:

$$|\Delta t_G - \Delta t| = \left|\frac{2 \cdot \Delta S \cdot n}{C} - \frac{\Delta S_1 \cdot n}{C}\right| = \frac{W_1 \cdot n}{C} = |2 \cdot \Delta S - \Delta S_1| < W_1 \qquad (13)$$

where ΔS is the spatial distance in which NLE 5626 is displaced from midpoint 5628 of loop 5624, $\Delta S_1$ is the spatial distance in which pulses 5639A and 5633A (or 5639B and 5633B) of code 5634C are separated by within radiation guide 5618 of loop 5624, and $W_1$ is the spatial width of either pulse 5639A or 5633A in guide 5618 of loop 5624.

Accordingly, it is clear that a coincidence pulse may be produced by code responsive gate 5603 when the absolute value of the difference between twice the displacement distance of NLE 5626 from mid point 5628 of loop 5624 and the distance between pulses 5633A and 5639A of code 5634C is shorter than the spatial width of one of pulses 5633A and 5639A.

In cases when large optical component 5633B in loop 5624 drives NLE 5626 into deep saturation, it may deplete the inverse carrier population in NLE 5626 and then NLE 5626 needs for a recovery time $\tau_r$ to return into an excited state. This means that optical component 5633B may affect small optical component 5639A by NLE 5626 even at a time $\tau_r$ after component 5633B exited out from NLE 5626. In such cases Equation (13) should take into account the recovery time $\tau_r$ and should be written as follows:

$$|\Delta t_G - \Delta t| = \left| \frac{2 \cdot \Delta S \cdot n}{C} - \frac{\Delta S_1 \cdot n}{C} \right| = \frac{W_1 \cdot n}{C} + \tau_r \quad (14)$$

accordingly, $$|\Delta t_G - \Delta t| = |2 \cdot \Delta S - \Delta S_1| < W_1 + \tau_r \cdot C/n \quad (15)$$

2. All Optical Code Responsive Chopping Gates

In addition, the width of the pulse, such as pulse 5670, of the response signal produced by gate 5603 at coincidence port 5677 in turn to a specific code, such as code 5634 received in input 5614 of gate 5603 after amplifier 5662, may be adjusted by optical chopping to produce pulse reshaping. Such pulse reshaping may be used for narrow pulse generation used for fast modulation or for dispersion compensation such as Chromatic Dispersions (CD) and Polarization Mode Dispersions (PMD). When NLE 5626 is displaced to the left of mid point 5628, the optical chopping is performed by partial overlapping between split pulses 5639A and 5633B. If NLE 5626 is displaced to the right of mid point 5628, the optical chopping is performed by partial overlapping between split pulses 5639B and 5633A. The analysis of the optical chopping below is done, for example and without limitations, for the situation illustrated by FIG. 3 in which NLE 5626 is displaced to the left of midpoint 5628. The optical chopping is performed according to the time space $\Delta t$ between the pulses of the input code symbol 5634 and the location $\Delta s$ of NLE 5626 on loop 5618. For producing the chopping, the relation between time space $\Delta t$ (between pulses 5639 and 5633) of code 5634 and the characterization time $\Delta t_G$ of coincidence gate 5603 should satisfy:

$$0 < |t_G - \Delta t| < W \quad (16)$$

where W is the time width of pulses 5639 and 5633 of code 5634. The optical chopping may be applied together with all the partially overlapping coincidence combinations, at NLE 5626, of split pulses 5639A and 5633B. The part of the small split pulse 5639A that overlaps large split pulse 5633B at NLE 5626 and large split pulse 5639B itself are both experiencing additional phase shift of $\pi$radians, by NLE 5626, with respect to the phase shift, produced by NLE 5626, to the part of pulse 5639A that does not overlaps 5633B. Split pulses 5639A and 5639B arrive simultaneously to coupler 5620 to interfere there, according to the relative phase shift between them, for producing output signal at non-coincidence port 5622 or coincidence port 5616 of loop mirror 5624. The overlapped part of split pulse 5639A interferers, with no relative phase shift, with its corresponding part in split pulse 5639B to produce coincidence signal at I/O port 5616 of loop mirror 5624 and from there to appear as chopped coincidence pulse 5670 at coincidence port 5677. In this case, output coincidence pulse 5670 has a width that is equal to the width of the overlapped part between pulses 5639A and 5633B. Pulses 5639A, 5639B and 5639 have all a width W that is wider than the width of the overlapped region between pulses 5639A and 5633B. Thus, coincidence pulse 5670 is narrower than any of the input pulses 5639 and 5633 of code 5634 at input 5614. The width of coincidence pulse 5670 is determined by the amount of the overlapping between pulses 5639A and 5633B and can be adjusted by the difference $|\Delta t_G - \Delta t| < W$ between the time spacing $\Delta t$ between pulses 5639 and 5633 of code 5634 and the characterization time $\Delta t_G$ of coincidence gate 5603. The difference $|\Delta t_G - \Delta t|$ should be less than the width W of pulses 5639 and 5633 to assure the existence of overlapping between their split pulses, 5639A and 5633B.

Similarly, the non-overlapped part of split pulse 5639A interferers, with $\pi$radians relative phase shift, with its corresponding part in split pulse 5639B to produce non-coincidence signal at port 5622 of loop mirror 5624 and from there to appear as chopped non-coincidence pulse 5653 at non-coincidence port 5622. In this case, non-coincidence pulse 5653 has a width that is equal to the width of the non-overlapped part between pulses 5639A and 5633B. Pulses 5639A, 5639B and 5639 have a width W that is wider than the width of the non-overlapped region between pulses 5639A and 5633B. Thus non-coincidence pulse 5653 is narrower than any of the input pulses 5639 and 5633 of code 5634 at input 5614. The width of non-coincidence pulse 5653 is determined by the amount of the non-overlapping between pulses 5639A and 5633B and can be adjusted by the difference $|\Delta t_G - \Delta t| < W$ between the time spacing $\Delta t$ between pulses 5639 and 5633 of code 5634 and the characterization time $\Delta t_G$ of coincidence gate 5603. The difference $|\Delta t_G - \Delta t|$ should be less than the width of split pulses 5633A and 5633B to insure the existence of overlapping between split pulses 5639A and 5633B.

In this case, the width of chopped coincidence signals 5670 at coincidence port 5677 and chopped non-coincidence signal 5653 at non-coincidence port 5622 is narrower than the width W of input pulses 5639 and 5633 of code symbol 5634 at input 5614. The summing of chopped coincidence signal 5670 width and chopped non-coincidence signal 5653 width is W, the width of the pulses 5639 and 5633 in code symbol 5634 at input 5614.

The discussion above as to the situations where NLE 5626 is displaced to the left and to the right from midpoint 5628 shows that these situations are different by the order in which the split pulses, in loop 5618, enter to NLE 5626. When NLE 5626 is displaced to the left of midpoint 5628, the first to enter NLE 5626 is large amplitude pulse 5639B which as result, produces the coincidence pulse at port 5677 that is related to first pulse 5639 in code 5634. When NLE 5626 is displaced to the right of midpoint 5628, the first to enter NLE 5626 is small amplitude pulse 5639A which as result, produces the coincidence pulse at port 5677 that is related to second pulse 5633 in code 5634. The order in which the split pulses in loop 5618 enter to NLE 5626 may be controlled by the position of attenuator 5668 as well.

Since there are many combinations in which NLE 5626 and attenuator 5668 can be displaced to the left or to the right from mid point 5628, we refer to the following two situations:

1. NLE 5626 is displaced to the left of midpoint 5628 generally describes the situation in which the large amplitude split pulse is the first to enter NLE 5626 during its propagation inside loop 5618.
2. NLE 5626 is displaced to the right of midpoint 5628 generally describes the situation in which the small amplitude split pulse is the fist to enter NLE 5626 during its propagation inside loop 5618.

Accordingly, the response of coincidence gate 5603 is as follows:

1. When gate 5603 receives at its input 5614 code 5634 including first pulse 5639, having spatial width W, and second pulse 5633, having spatial width W, separated by time space Δt that is equal to the characterization time Δt$_G$ of gate 5603, thus (|Δt$_G$−Δt|=0):

a. In case that NLE 5626 is displaced to the left of midpoint 5628 of loop 5618, coincidence signal 5670, related to first pulse 5639 of code 5634, is produced with a width W equal to the width of pulse 5639 (no chopping) at coincidence port 5677 and non-coincidence pulse 5653, related to second pulse 5633 of code 5634, is produced at non-coincidence port 5622.

b. In case that NLE 5626 is displaced to the right of midpoint 5628 of loop 5618, coincidence signal 5670, related to second pulse 5633 of code 5634, is produced with a width W equal to the width of pulse 5633 (no chopping) at coincidence port 5677 and non-coincidence pulse 5653, related to first pulse 5639 of code 5634, is produced at non-coincidence port 5622.

2. When gate 5603 receives at its input 5614 code 5634 including first pulse 5639 and second pulse 5633 separated by time space Δt that is different from the characterization time Δt$_G$ of gate 5603 by an amount greater than W, thus (|Δt$_G$−Δt|>W), no coincidence signal is produced, by coincidence gate 5603, at port 5677 and pulses 5639 and 5633 are transmitted, by gate 5603, into non-coincidence port 5622. This situation occurs whether the displacement of NLE 5626 is to the left or to the right of midpoint 5628.

3. When gate 5603 receives at its input a single pulse (no code), either first pulse 5639 or second pulse 5633, no coincidence signal is produced, by coincidence gate 5603, at port 5677 and either single pulse 5639 or 5633 is transmitted, by gate 5603, into non-coincidence port 5622. This situation occurs whether the displacement of NLE 5626 is to the left or to the right of midpoint 5628.

4. When gate 5603 receives at its input 5614 code symbol 5634 including first pulse 5639 and second pulse 5633 separated by time space at that is different from the characterization time of gate 5603 by an amount smaller than W, thus (0<|Δt$_G$−Δt|<W), coincidence gate 5603 operates in a manner similar to the described in clause 1 above with the exception that the coincidence pulse is chopped and divided between coincidence port 5677 and non-coincidence port 5622 to appear there as chopped pulse. The amount of chopping depends on the difference |Δt$_G$−Δt|. The summing of chopped pulse 5670 width, at port 5677, and chopped pulse 5653 width, at port 5622, is W, which is the original pulses 5639 and 5633 widths.

Coincidence gate 5603 is a phase insensitive device due to the use of loop 5618 and NLE 5626. In a situation where couplers 5620 and 5665 are wavelength insensitive couplers, gate 5603 is a phase and wavelength insensitive device.

3. Block Diagram Presentation of the Coincidence Gates

FIGS. 4a, 4b, 4c and 4d illustrate a presentation of coincidence gate 5603 of FIG. 3 by bock diagram illustrations 5700 and 5730 in configurations where NLE 5626 of gate 5603 is displaced to the left and to the right from midpoint 5628, respectively, and where different code symbols 5710, 5760, and 5780, and code symbol 5740 are received in respective inputs of gates 5700 and 5730.

Figure 4A:
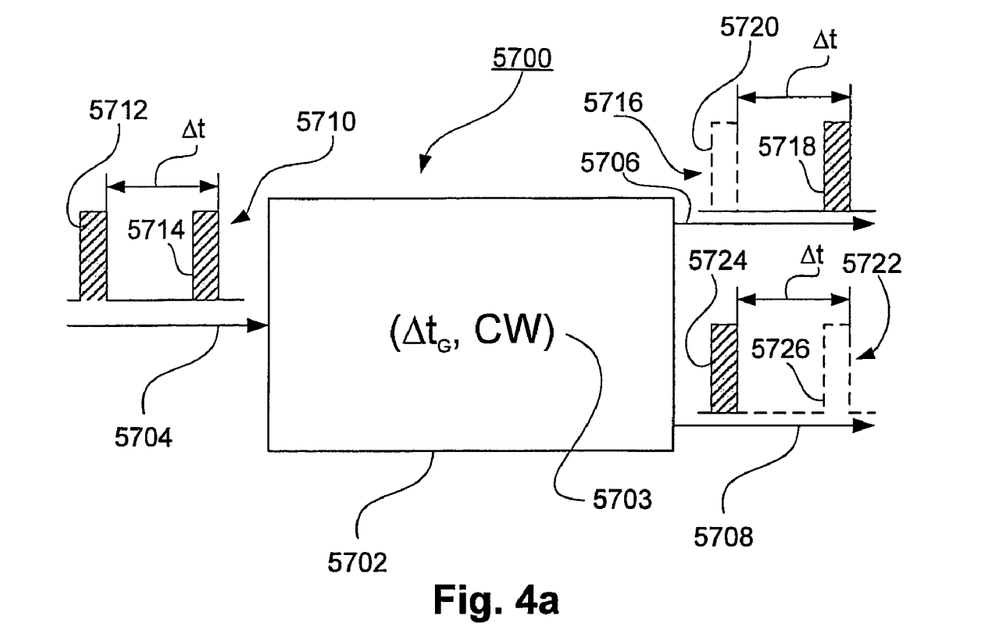
FIGS. 4a, 4b, 4c, and 4d are schematic conceptual illustrations of various coincidence gates and their responses to various input code symbols.

Reference is now made to FIGS. 3 and 4a. FIG. 4a illustrates coincidence gate 5700, representing gate 5603 of FIG. 3, by block 5702. Coincidence gate 5700 having input 5704, coincidence output 5706, and non-coincidence output 5708 corresponding to input 5614, coincidence output 5677, and non-coincidence output 5622 of gate 5603 of FIG. 3, respectively. Gate 5700 is characterized by its characterization label 5703 in block 5702. Characterization label 5703 indicates specific coincidence time Δt$_G$ of gate 5700 and specific displacement orientation CW that stands for Clockwise displacement of NLE 5626 from midpoint 5628 of loop 5618 of gate 5603 of FIG. 3. In this case NLE 5626 is displaced to the left of midpoint 5628 as illustrated by FIG. 3. Code symbol 5710 is received at input port 5704 of gate 5700 and including pulses 5712 and 5714 that are separated by time space Δt that is equal to coincidence time Δt$_G$ of gate 5700. In response, gate 5700 produces, at its coincidence and non-coincidence output ports 5706 and 5708, coincidence signal 5716 including coincidence pulse 5718 and non-coincidence signal 5722 including non-coincidence pulse 5724, respectively. Coincidence port 5706 and non-coincidence port 5708 have the same length and thus produces the same delay. In this case coincidence pulse 5718, at port 5706, is the first to be emitted out and is followed, after a time Δt, by the emission of non-coincidence pulse 5724, at port 5708. For the purpose of illustrating a time reference, broken line 5720 at port 5706 marks the time position of pulse 5724 at non-coincidence port 5708 as if it would appear in port 5706. Similarly, broken line 5722 at port 5708 marks the time position of pulse 5718 at coincidence port 5706 as if it would appear at port 5708. Accordingly, it can be seen that the time space Δt between pulses 5714 and 5712 of code 5710 at input 5704 is maintained also between coincidence pulse 5718 and non-coincidence pulse 5724 at ports 5706 and 5708, respectively.

Figure 4B:
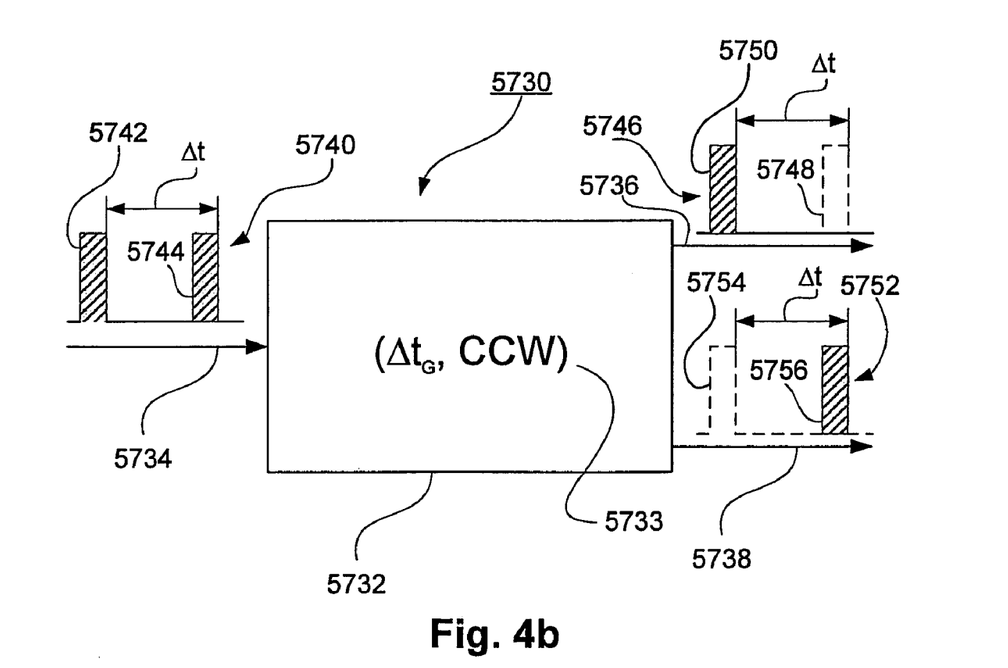

Reference is now made to FIGS. 3 and 4b. FIG. 4b illustrates coincidence gate 5730 representing gate similar to gate 5603 of FIG. 3 by block 5732. Coincidence gate 5730 having input 5734, coincidence output 5736, and non-coincidence output 5738. Gate 5730 is characterized by its characterization label 5733 in block 5732 corresponding to input 5614, coincidence output 5677, and non-coincidence output 5622 of gate 5603 of FIG. 3, respectively. Characterization label 5733 indicates specific coincidence time Δt$_G$ of gate 5730 and specific displacement orientation CCW that stands for Counter-clockwise displacement of NLE 5626 from midpoint 5628 of loop 5618 of gate 5603 of FIG. 3. In this case, NLE 5626 is displaced to the right of midpoint 5628 in a direction opposite to the displacement direction of NLE 5626 illustrated by FIG. 3. Code symbol 5740 is received at input port 5734 of gate 5730 and including pulses 5742 and 5744 that are separated by time space Δt that is equal to coincidence time Δt$_G$ of gate 5730. In response, gate 5730 produces, at its coincidence and non-coincidence output ports 5736 and 5738, coincidence signal 5746 including coincidence pulse 5750 and non-coincidence signal 5752 including non-coincidence pulse 5756, respectively. Coincidence port 5736 and non-coincidence port 5738 have the same length and thus produces the same delay. In this case non-coincidence pulse 5756, at port 5738, is the first to be emitted out and is followed, after a time Δt, by the emission of coincidence pulse 5750, at port 5736. To illustrate a time reference, broken line 5748 at port 5736 marks the time position of pulse 5756 at non-coincidence port 5738 as if it would appear at port 5736. Similarly, broken line 5754 at port 5708 marks the time position of pulse 5750 at coincidence port 5736 as if it would appear at port 5738. Accordingly, it can be seen that the time space Δt between pulses 5744 and 5742 of code 5740 at input 5734 is maintained also between non-coincidence pulse 5756 and coincidence pulse 5750 at ports 5738 and 5736, respectively.

It can be seen that in gate 5700, having clockwise displacement of its NLE from the midpoint of its loop, the coincidence pulse is the first to be emitted from the coincidence port and it is followed, with a delay Δt, by the non-coincidence pulse emitted by the non-coincidence port. In gate 5730 having counter-clockwise displacement of its NLE from the midpoint of its loop, the non-coincidence pulse is the first to be emitted and it is followed, with a delay Δt, by the coincidence pulse emitted by the coincidence port.

Figure 4C:
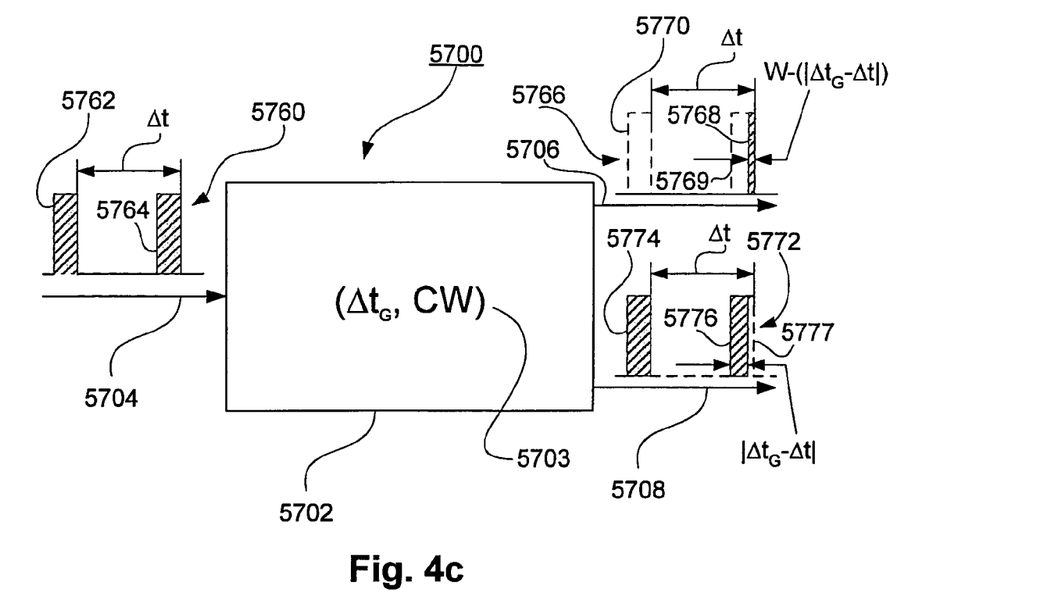

FIG. 4c illustrates gate 5700 similar to gate 5700 of FIG. 4a and thus the same referral numeral are used for same structures, symbols, and signals. Gate 5700 of FIG. 4c is illustrated in a situation where it receives code symbol 5760, at its input 5704, having pulses 5764 and 5762 separated by a time space Δt that satisfies:

$$0 < |\Delta t_G - \Delta t| < W \quad (17)$$

where W is the width of pulses 5764 and 5762. In turn, gate 5700 produces chopped coincidence pulse 5768 of coincidence signal 5766, at coincidence output 5706 having width $W - |\Delta t_G - \Delta t|$. Immediately after pulse 5768 at coincidence port 5706, chopped non-coincidence pulse 5776 of non-coincidence signal 5772 is produced at non-coincidence output port 5708 having a width that is equal to $|\Delta t_G - \Delta t|$. At a time Δt after the emission of chopped coincidence pulse 5768 at coincidence port 5706, additional non-coincidence pulse 5774 of non-coincidence signal 5772 is produced at non-coincidence port 5708. For the illustration of a time reference, broken lines 5770 and 5769 mark the time positions of non-coincidence pulses 5774 and 5776, respectively, at port 5708 as if they would appear in coincidence port 5706. Similarly, broken line 5777 marks the time position of coincidence pulse 5768 at port 5706 as if it would appear in non-coincidence port 5708.

Figure 4D:
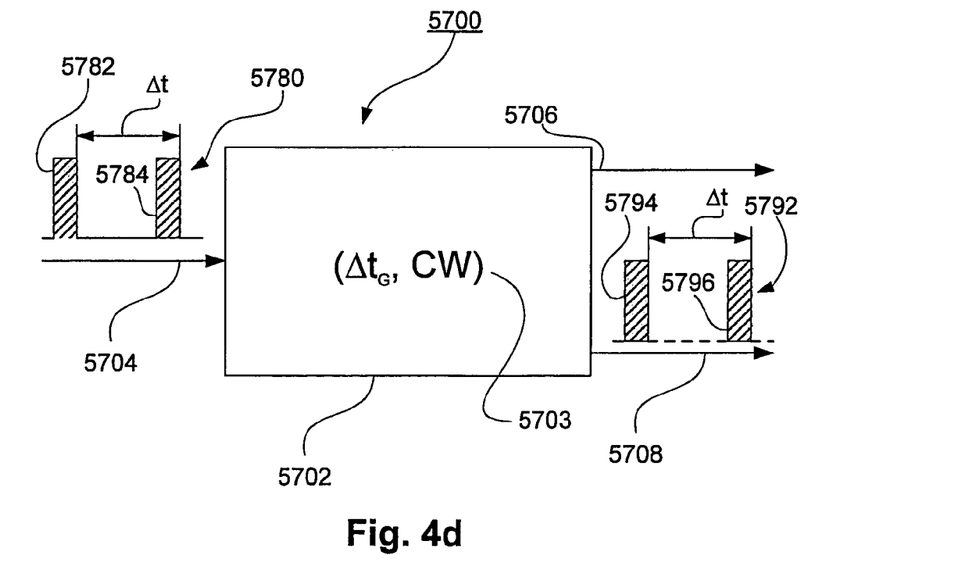

FIG. 4d illustrates gate 5700 similar to gate 5700 of FIGS. 4a and 4c and thus the same referral numeral are used for same structures, symbols, and signals. Gate 5700 of FIG. 4d is illustrated in a situation where it receives code symbol 5780, at its input 5704, having pulses 5784 and 5782 separated by a time space Δt that satisfies:

$$|\Delta t_G - \Delta t| < W \quad (18)$$

where W is the width of pulses 5784 and 5782. In turn, gate 5700 produces non-coincidence signal 5792, at non-coincidence port 5708, including non-coincidence pulses 5796 and 5794 having width W and are separated by time space Δt. In this case no coincidence signal is produced at coincidence port 5706.

It should be clear that similar results may be obtained when code 5780 is received by gate 5730 of FIG. 4b in which its NLE is displaced counter-clockwise from the midpoint of its loop and is characterized by same coincidence time $\Delta t_G$. As explained above, code responsive gates 5700 and 5730 may produce the appearance of the coincidence signal and the non-coincidence signal in different orders.

4. Code Symbology and Code Separation

Reference is now made to FIGS. 5a, 5b, 5c, 5d and 5e illustrating time envelop 5800 including time slots 5802 that may include code symbols 5820, 5822, 5824 and 5826 and information pulses in the forms of pulses 5804, and 5818. For illustration clarity, code symbols 5820, 5822, 5824 and 5826 are filled with a cross hatch. In addition code symbol pairs are illustrated having a connecting broken bold line at their top. For the same purpose of illustration clarity, information pulses 5804 and 5818 are filled with a diagonal hatch. FIGS. 5a, 5b, 5c, 5d and 5e are all illustrated with time envelop 5800 and similar types of signals and thus the same referral numeral are used for the same signals, pulses, codes signals, time envelop and time slots.

It should be noted that the code signals may be the codes of header sections in optical packets and the information signals may be the payload sections of these optical packets. In such a case, the code responsive gate may serve as an optical header processor or reader.

Figure 5A:
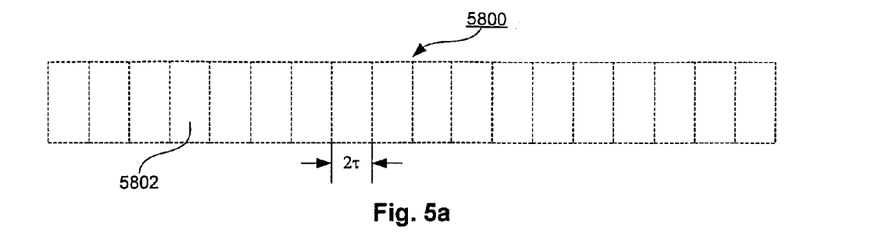
FIGS. 5a, 5b, 5c, 5d, and 5e are schematic illustrations of time slot formats and various pulse streams including information pulses and code symbols synchronized to propagate within the time slot formats.

FIG. 5a illustrates, by a broken line, time presentation of envelop 5800 including time slots 5802 having time width of 2τ. Time slots 5802 indicate the time space reserved for radiation pulses that may or may not be included in these time slots.

Figure 5B:
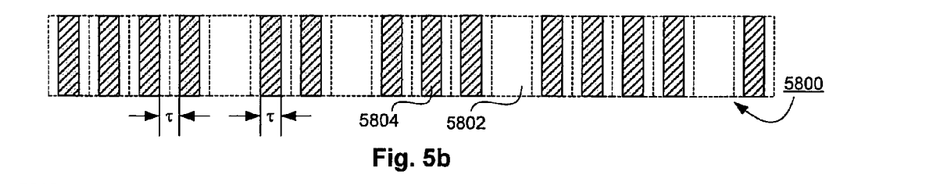

FIG. 5b illustrates an exemplary situation in which radiation pulses 5804 occupies part of time slots 5802 of time envelop 5800. In this example, the occupation of time slots 5802, by pulses 5804, is arbitrary and some of time slots 5802 remain unoccupied. Pulses 5804 are centered in each time slot 5802 that they occupy and having time width of τ. Since the width of time slots 5802 is 2τ and the width of pulses 5804 is τ, the space between two following adjacent pulses is τ.

Figure 5C:
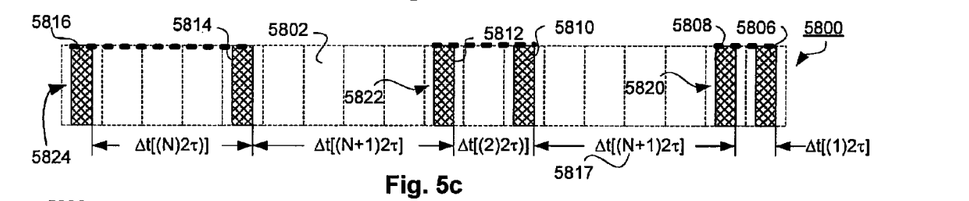

FIG. 5c illustrates time slots 5802 of time envelop 5800 in exemplary situation where slots 5802 are occupied by code symbols 5820, 5822, and 5824. Each of code symbols 5820, 5822, and 5824 includes pair of pulses having a time space between these pair of pulses, measured by time units, which are equal to width 2τ of time slots 5802. Code symbols 5820, 5822 and 5824 may be the codes of header sections of optical packets. Code symbol 5820 includes pair of pulses 5806 and 5808 separated by time space $\Delta t[(1)2\tau]$ that is equal to the width of 1 time slot 5802. Code symbol 5822 includes pair of pulses 5810 and 5812 separated by time space $\Delta t[(2)2\tau]$ that is equal to the width of 2 time slots 5802. Similarly, the widest code symbol 5824 used in the system includes pair of pulses 5814 and 5816 separated by time space $\Delta t[(N)2\tau]$ that is equal to the width of N time slots 5802. Code 5824 may be the $N^{th}$ code in a series of many different codes (headers) having indices j that only codes 5820, 5822, and 5824 in this series are shown.

Stream of codes j may be received by each of the coincidence gates in a group of coincidence gates. In such a case, for each specific code j in the series of codes, there is a dedicated coincidence gate having the same index j and is characterized by specific coincidence time $\Delta t_G(j)$ that responds, by producing coincidence signal, only to the specific code j that the time separation $\Delta t(j)$ between the pair of its pulses is equal to $\Delta t_G(j) \pm W$.

To avoid unwanted response from any of coincidence gates j, a certain time guard-band 5817 may be maintained between the different codes j. Some of coincidence gates j may be activated, accidentally, by the formation of undesired codes constructed between pulses related to different codes j. For example, the space between either pulse in the pair of pulses 5806 or 5808 in code 5820 and either pulse in the pair of pulses 5810 or 5812 in code 5822 may construct an undesired code symbol in which the space between its pair of pulses may be equal to specific coincidence time $\Delta t_G(j)$ of coincidence gate j. To avoid such a possibility, resulting in an undesired coincidence pulse, the time guard-band between the wanted codes may be larger than the largest coincidence time $\Delta t_G(j=N)$ of any gate j used in the system. When the time space between the pulses of different codes j is larger than the coincidence time of any gate j, no undesired coincidence pulse can be produced. For the specific example illustrated by FIG. 5c, code 5824 has the widest time space $\Delta t[(N)2\tau]$ between its pair of pulses 5814 and 5816 and is equal to $(N)2\tau$. Accordingly, as illustrated by FIG. 5c, the time guard-band between the code symbols j, such as code symbols 5820, 5822, and 5824 is larger than $2N\tau$ and for example is equal to time space $\Delta t[(N+1)2\tau]= (N+1)2\tau$.

Figure 5D:
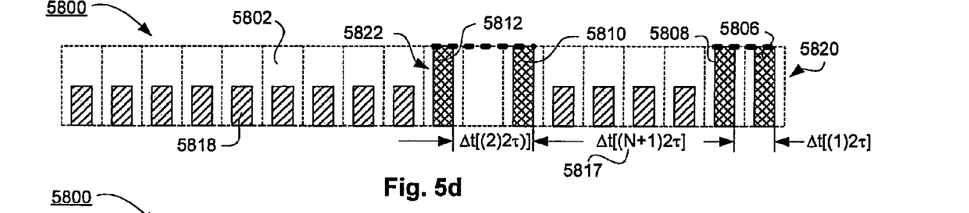

FIG. 5d illustrates code symbols 5820 and 5822 of FIG. 5c in an efficient configuration where guard-bands 5817 are used to transmit information pulses (payloads) that are not related to code symbols (headers) j, such as codes signals 5820 and 5822. Information pulses 5818 are illustrated, in the exemplary illustration of FIG. 5d, by a pulse pattern that occupies all time slots 5802 of envelop 5800 in guard-bands 5817. This specific pattern of information pulses can be in other forms as well. To demonstrate the efficiency of the method illustrated by FIG. 5d for separation between code symbols j and information pulses 5818, the specific pattern of information pulses 5818 shown in FIG. 5d was chosen. In this pattern of information pulses 5818, the probability for producing undesired coincidence pulse, due to the formation of undesired code symbols produced between pulses 5806, 5808, 5810, and 5812 of code symbols 5820 and 5822 and information pulses 5818, is the highest.

To avoid the formation of undesired coincidence codes, resulting in the production of undesired coincidence pulses, by coincidence gates j, the amplitudes of pulses 5806 and 5808 and 5810 and 5812 of code symbols 5820 and 5822, respectively, may be larger than the amplitudes of information pulses 5818. The amplitudes of pulses 5806 and 5808 and 5810 and 5812 of code symbols 5820 and 5822, respectively, maybe adjusted to be above the threshold level of certain optical threshold devices (not shown) and the amplitudes of information pulses 5818 may be adjusted to be below the threshold level of these optical threshold devices. In such a case and where these optical threshold devices are installed at the input of coincidence gates j, only the large amplitudes of code symbols 5820 and 5822 are received by coincidence gates j and thus due to the proper time guard bands 5817 between the codes transmitted into gates j, no undesired coincidence signals are produced by coincidence gates j. For clarity of the illustration, code symbols having above threshold amplitude are represented by a tall box, while information pulses, having below threshold amplitudes, are represented by a short box.

It can be seen that by using different amplitudes for pulses 5806 and 5808 and 5810 and 5812 of code symbols 5820 and 5822 and information pulses 5818, the code symbols may be separated from the information pulses. The separation is performed, by optical threshold devices installed at the inputs of gates j, to avoid the formation of unwanted coincidence pulses, by gates j, while still using the time space of guard-bands 5817 for sending information pulses.

This configuration may be used for optical packet routing and switching where the headers that include the code symbols of the optical packets may be separated from their payloads using an optical threshold device and the length of the payloads, which are removed, may be adjusted to leave vacant spaces between the codes of the headers to serve as a guard-band that avoids undesired production of a coincidence signal.

Figure 5E:
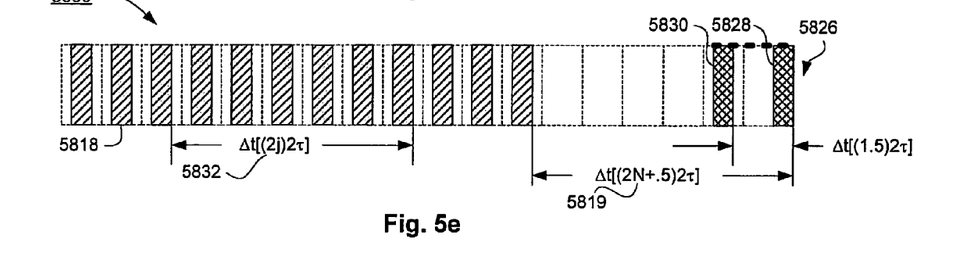

FIG. 5e illustrates another method for sending information pulses 5818 by an efficient format using dense format for information pulses 5818 while still avoiding the creation of unwanted coincidence pulses.

FIG. 5e illustrates code symbol 5826 including pulses 5828 and 5830 that may have the same amplitude as the amplitude of information pulses 5818. Pulse 5828 of code 5826 is positioned in between two adjacent time slots 5802 and pulse 5830 is centered within time slots 5802. Thus, pulses 5828 and 5830 of code 5826 are separated by time space that is equal to $(1.5)2\tau=3\tau$. Similarly, the other code symbols (not shown), such as code 5826, include pair of pulses that one of them is positioned between two adjacent time slots 5802 and the other one is centered within time slot 5802. Accordingly, the pair of pulses in the other codes of FIG. 5e (not shown) are separated by time spaces that are equal to odd integral numbers of $\tau$. Information pulses, in contrast, 5818 are separated by time spaces, such as space 5832, that are equal to even integral number of $\tau$.

Accordingly, coincidence gates j, are characterized by coincidence times $\Delta t_G(j)$ designed to produce coincidence pulse in response to code symbols having separation time $(j)\Delta t$ that is equal to odd integral numbers of $\tau$ and thus do not response to information pulses 5818 separated by separation time $\Delta t$ that is equal to even integral numbers of $\tau$. Code 5826 may be separated from pulses 5818 by time guard-band 5819 that is wider than the widest characterization time $\Delta t_G(N)$ of gate j used in the system. Guard-band 5819 assures that no unwanted coincidence pulse would be produced by any of gates j as a result of formations of unwanted code symbols created between the pulses of codes, such as code 5826 and information pulses 5818.

Accordingly, it can be seen that code symbols such as code 5826 may be distinguished from information pulses 5818 by using a different parity for the integral numbers of $\tau$ representing the time spacing between information pulses 5818 and the pulses in the pairs of the code symbols j. This distinguish between information pulses 5818 and codes, such as code 5826 with the additional guard-band 5819 assures that gates j will respond only to the code symbols j even when information pulses 5818 are arranged with a format with the highest density possible, as illustratred in FIG. 5e.

The exemplary embodiments according to the present, as described above, as well as additional embodiments, e.g., as may be suitable for specific applications, may include a continuous sequence of optical components connected by light guiding media such as, for example, optical fibers, planar waveguides, or planar circuits PLC), which media may be fabricated using integrated optic techniques and/or on-chip manufacturing. Alternatively, exemplary according to the present may be constructed at least partly from discrete components, in which case the optical guiding media may be replaced by open space, e.g., vacuum, or by a non-solid, e.g., gaseous media, and the directional couplers may be replaced with directing devices, couplers splitters, beam splitters and circulators. It should be understood that all amplifiers and attenuators may include variable and/or adjustable components. It should be clear that all amplifiers may made of amplifying media and devices and in particular are made of SOA's, LOA's and EDFA's. It should be appreciated that attenuators as those used in conjunction with embodiments of the present invention may be formed of attenuating media and devices and, in particular, couplers and absorbing amplifiers.

It should be understood that the code symbols may be the codes of headers of optical packets in which the information pulses are the pulses of the payloads of these optical packets. It should also be noted that the code responsive gates according to the present invention may serve as optical header processors and optical header readers that may be used for header recognition. It should also be understood that the codes according to the present invention may be signals in a form of encoded symbols that may serve as the addresses of the packets. The code responsive devices according to the present invention may be decoding devices that may be used to decode those symbols.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

The invention claimed is:

1. An optical decoding device comprising:
a splitting device having first, second, and third terminals;
a nonlinear element, selected from a group of nonlinear elements including optical amplifiers, semiconductor optical amplifiers, linear optical amplifiers, and Erbium doped fiber amplifiers; and
an attenuator,
wherein said second and third terminals are associated with an optical loop including said attenuator and said nonlinear element, said nonlinear element being displaced from a mid-point of said optical loop and operating in a mode selected from a group of operation modes including linear gain and saturated gain, and
wherein said decoding device is able to receive multiple encoded signals via said first terminal, to decode at least one encoded signal of said multiple encoded signals, and to provide a decoded signal at said first terminal in response to said at least one encoded signal.

2. The decoding device of claim 1, wherein said splitting device is able to receive said encoded signals via said first terminal and to produce first and second images of each of said encoded signals, said first and second images counter-propagating along said optical loop.

3. The decoding device of claim 2, wherein said decoding device decodes said at least one encoded signal when said nonlinear element provides cross-phase modulation between said first and second images of each of said encoded signals.

4. The decoding device of claim 1, wherein said encoded signals are selected from a group of encoded signals including codes, symbols, headers of optical packets, and addresses of optical packet.

5. The decoding device of claim 1, wherein said device is selected from a group of decoding devices including code responsive devices, decoders, header readers, header processors, header recognizers, and decoders of symbol signals.

6. The decoding device of claim 1, wherein said attenuator is selected from a group of attenuators including variable optical attenuators, optical amplifiers, semiconductor optical amplifiers, couplers, and portions of radiation guides introducing loss.

7. The decoding device of claim 1, wherein said first terminal is associated with a directing device for directing said decoded signal from said first terminal to a fourth terminal.

8. The decoding device of claim 7, wherein said directing device is selected from a group of directing devices including couplers, directional couplers, splitters, beam splitters, and circulators.

9. The decoding device of claim 1, wherein said device is constructed, at least in part, in a medium selected from a group of media including discrete components, integrated optics, optical fibers, on-chip devices, waveguides, planar waveguides, planar circuits, free space, vacuum, and gaseous media.

10. The decoding device of claim 1, wherein each of said encoded signals has first and second pulses separated by a time space.

11. The decoding device of claim 10, wherein said decoded signal has a pulse having a width equal to the width of the pulses in said encoded signals.

12. The decoding device of claim 10, wherein said decoded signal has a pulse having a width narrower than the width of the pulses in said encoded signals.

13. The decoding device of claim 12, wherein said encoded signals are in headers of optical packets, and wherein said optical packets include payloads having information pulses.

14. The decoding device of claim 13, wherein said device receives said encoded signals from an optical threshold device, and wherein said threshold device separates said encoded signals from said information pulses.

15. The decoding device of claim 13, wherein said encoded signals have amplitudes larger than the amplitudes of said information pulses.

16. The decoding device of claim 15, wherein the time space between said first and second pulses of said encoded signals is different from the time space between said information pulses of said payloads.

17. The decoding device of claim 12, wherein said decoded signal includes at least part of the energy of said first pulse of said at least one encoded signal.

18. The decoding device of claim 12, wherein said decoded signal includes at least part of the energy of said second pulse of said at least one encoded signal.

19. The decoding device of claim 1, wherein said splitting device further includes a fifth terminal able to provide non-decoded signals.

20. The decoding device according to claim 7, wherein said splitting device further includes a fifth terminal, and wherein the decoding device is able to receive said at least one encoded signal via said first terminal, to provide said decoded signal, having one pulse, from said fourth terminal, and to provide a non-decoded signal, having one pulse, from said fifth terminal.

21. The decoding device according to claim 7, wherein said splitting device further includes a fifth terminal, and wherein the decoding device is able to receive said at least one encoded signal, having first and second pulses separated by a time space, via said first terminal, to provide said decoded signal, having one pulse, from said fourth terminal, and to provide a non-decoded signal, having two pulses, from said fifth terminal, wherein the one pulse of said decoded signal is narrower than one of the first and second pulses of said at least one encoded signal.

22. The decoding device according to claim 7, wherein said splitting device further includes a fifth terminal, and wherein the decoding device is able to receive said at least one encoded signal, having first and second pulses separated by a time space, via said first terminal, to provide said decoded signal, having one pulse, from said fourth terminal, and to provide a non-decoded signal, having two pulses, from said fifth terminal, wherein said pulse of said decoded signal is narrower than said first and second pulses of said at least one encoded signal.

23. The decoding device according to claim 7, wherein said splitting device further includes a fifth terminal, and wherein the decoding device is able to receive said at least one encoded signal, having first and second pulses separated by a time space, via said first terminal, to provide said decoded signal, having one pulse, from said fourth terminal, and to provide a non-decoded signal, having two pulses, from said fifth terminal, wherein the one pulse of said decoded signal and one of the two pulses of said non-decoded signal are narrower than said first and second pulses of said at least one encoded signal.

24. The decoding device of claim 19, able to receive one of said encoded signals, other than said at least one encoded signal, via said first terminal, and to provide a non-decoded signal, having two pulses, from said fifth terminal.

25. The decoding device of claim 1, wherein said encoded signals have an intensity level above the threshold level of said decoding device.

26. The decoding device of claim 1, wherein said first terminal is associated with an optical amplifier.

27. The decoding device of claim 1, wherein said decoded signal includes a single pulse.

28. An optical code responsive device for decoding optical codes, for header processing, for header reading, and/or for optical packet routing, comprising:

a splitting device having first, second, and third terminals;
a nonlinear element having a recovery time $\tau_r$; and
an attenuator,
  wherein said second and third terminals are associated with an optical loop including said attenuator and said nonlinear element, said nonlinear element being displaced by a distance $\Delta S$ from a mid-point of said optical loop,
  wherein said splitting device is able to receive, via said first terminal, code signals including first and second pulses separated by a distance $\Delta S_1$ and having a width $W_1$, and
  wherein said code responsive device is able to produce a response signal at said first terminal in response to one or more of said code signals that satisfy the mathematical expression $|2 \cdot \Delta S - \Delta S_1| < W_1 + \tau_r \cdot C/n$, where C is the speed of light in vacuum and n is the refractive index of the signal guide in said loop.

* * * * *